United States Patent
Tanaka et al.

(10) Patent No.: US 10,857,502 B2
(45) Date of Patent: Dec. 8, 2020

(54) ABSORBENT LIQUID FOR $CO_2$ AND/OR $H_2S$, AND APPARATUS AND METHOD USING SAME

(71) Applicants: Mitsubishi Heavy Industries Engineering, Ltd., Kanagawa (JP); The Kansai Electric Power Co., Inc., Osaka (JP)

(72) Inventors: Hiroshi Tanaka, Tokyo (JP); Takuya Hirata, Tokyo (JP); Masami Kondo, Tokyo (JP); Takashi Kamijo, Tokyo (JP); Tatsuya Tsujiuchi, Tokyo (JP)

(73) Assignees: Mitsubishi Heavy Industries Engineering, Ltd., Kanagawa (JP); The Kansai Electric Power Co., Inc., Osaka (JP)

( * ) Notice: Subject to any disclaimer, the term of this patent is extended or adjusted under 35 U.S.C. 154(b) by 0 days.

(21) Appl. No.: 15/765,226

(22) PCT Filed: Sep. 23, 2016

(86) PCT No.: PCT/JP2016/077987
§ 371 (c)(1),
(2) Date: Mar. 30, 2018

(87) PCT Pub. No.: WO2017/057179
PCT Pub. Date: Apr. 6, 2017

(65) Prior Publication Data
US 2018/0280867 A1    Oct. 4, 2018

(30) Foreign Application Priority Data
Sep. 30, 2015 (JP) .................. 2015-194102

(51) Int. Cl.
*B01D 53/14* (2006.01)
*B01D 53/52* (2006.01)
(Continued)

(52) U.S. Cl.
CPC ..... *B01D 53/1493* (2013.01); *B01D 53/1462* (2013.01); *B01D 53/526* (2013.01);
(Continued)

(58) Field of Classification Search
None
See application file for complete search history.

(56) References Cited

U.S. PATENT DOCUMENTS 4,112,052 A * 9/1978 Sartori ............... B01D 53/1475
423/228
2010/0126348 A1 5/2010 Shimizu et al.
(Continued)

FOREIGN PATENT DOCUMENTS

EP    1872846 A1    1/2008
JP    2008-168227 A    7/2008
(Continued)

OTHER PUBLICATIONS

International Preliminary Report on Patentability issued in corresponding International Application No. PCT/JP2016/077987 dated Apr. 3, 2018 (10 pages).
(Continued)

*Primary Examiner* — Daniel Berns
(74) *Attorney, Agent, or Firm* — Osha Bergman Watanabe & Burton LLP

(57) ABSTRACT

An absorbent liquid which absorbs at least one of $CO_2$ and $H_2S$ from a gas, including a secondary linear monoamine; a tertiary linear monoamine or a sterically hindered primary monoamine; and a secondary cyclic diamine, wherein a concentration of each of the secondary linear monoamine, the tertiary linear monoamine or the sterically hindered primary monoamine; and the secondary cyclic diamine is less than 30% by weight.

12 Claims, 3 Drawing Sheets

(51) Int. Cl.
*B01D 53/62* (2006.01)
*B01D 53/78* (2006.01)

(52) U.S. Cl.
CPC ............ *B01D 53/62* (2013.01); *B01D 53/78* (2013.01); *B01D 2252/20405* (2013.01); *B01D 2252/20421* (2013.01); *B01D 2252/20426* (2013.01); *B01D 2252/20431* (2013.01); *B01D 2252/20447* (2013.01); *B01D 2252/20478* (2013.01); *B01D 2252/20484* (2013.01); *Y02A 50/20* (2018.01); *Y02C 20/40* (2020.08); *Y02P 20/151* (2015.11)

(56) References Cited

U.S. PATENT DOCUMENTS

| | | | |
|---|---|---|---|
| 2010/0180764 A1* | 7/2010 | Inoue | B01D 53/1462 95/186 |
| 2014/0234192 A1 | 8/2014 | Hirata et al. | |

FOREIGN PATENT DOCUMENTS

| | | |
|---|---|---|
| JP | 2009-213974 A | 9/2009 |
| JP | 4634384 B2 | 2/2011 |
| JP | 2011-194388 A | 10/2011 |
| JP | 2013-086079 A | 5/2013 |
| JP | 5215595 B2 | 6/2013 |
| JP | 2016-137422 A | 8/2016 |
| WO | 2009001804 A1 | 12/2008 |
| WO | 2013058286 A1 | 4/2013 |

OTHER PUBLICATIONS

International Search Report issued in corresponding International Application No. PCT/JP2016/077987 dated Nov. 1, 2016 (2 pages).
Extended European Search Report issued in European Application No. 16851353.9, dated Sep. 24, 2019 (13 pages).

* cited by examiner

ABSORBENT LIQUID FOR CO₂ AND/OR H₂S, AND APPARATUS AND METHOD USING SAME

TECHNICAL FIELD

One or more embodiments of the present invention relate to an absorbent liquid for $CO_2$ (carbon dioxide) and/or $H_2S$ (hydrogen sulfide), and an apparatus and a method using the same, and in particular to an absorbent liquid for $CO_2$ in combustion exhaust gas and an apparatus and a method for removing $CO_2$.

BACKGROUND

A variety of methods have conventionally been proposed concerning the method of removing acid gases, in particular, $CO_2$, which are contained in gases produced at chemical plants and power plants such as natural gas and synthetic gas and combustion exhaust gas. Examples of such a method include a method of removing $CO_2$ and $H_2S$ from combustion exhaust gas by contact with an aqueous solution of an alkanolamine as an absorbent liquid.

Taking as an example an absorbent liquid of monoethanolamine (MEA) being a primary monoamine among alkanolamines, for example, the above absorbent liquid itself deteriorates due to oxygen and the like in the combustion exhaust gas. Thus, there are known an absorbent liquid formed by blending a secondary monoamine with a secondary cyclic diamine or a particular primary monoamine having a high steric hindrance effect (for example, Patent Document 1), an absorbent liquid formed by adding a tertiary monoamine to a mixture of a secondary monoamine and a secondary cyclic diamine (for example, Patent Documents 2 and 3), and an absorbent liquid formed by mixing a particular primary monoamine having a high steric hindrance effect, a secondary monoamine, and a tertiary monoamine (for example, Patent Document 4).

REFERENCE DOCUMENT LIST

Patent Documents

Patent Document 1: Japanese Patent No. 5215595
Patent Document 2: Japanese Patent No. 4634384
Patent Document 3: Japanese Unexamined Patent Application Publication No. 2013-086079
Patent Document 4: Japanese Unexamined Patent Application Publication No. 2008-168227

However, in the case of the components and their blend ratio for the absorbent qliquids disclosed in Patent Documents 1 to 4, the reboiler for regenerating the absorbent liquid requires a large amount of heat.

SUMMARY

Considering the above circumstances, one or more embodiments of the present invention aim to provide an absorbent liquid for $CO_2$ and/or $H_2S$, and an apparatus and a method using the same, which make it possible to reduce the reboiler heat duty when regenerating the absorbent liquid.

According to one or more embodiments of the present invention, an absorbent liquid which absorbs $CO_2$ and/or $H_2S$ in a gas, includes: (a) a secondary linear monoamine; (b1) a tertiary linear monoamine or (b2) a sterically hindered primary monoamine; and (c) a secondary cyclic diamine, in which a concentration of each of the components is less than 30% by weight.

According to one or more embodiments of the present invention, in the absorbent liquid as described herein, the concentration of (c) the secondary cyclic diamine is less than the concentration of (a) the secondary linear monoamine and is less than the concentration of (b1) the tertiary linear monoamine or (b2) the primary monoamine in weight percent relative to the absorbent liquid.

According to one or more embodiments of the present invention, in the absorbent liquid as described herein, the concentration of (b1) the tertiary monoamine or (b2) the sterically hindered primary monoamine is the same as or less than the concentration of (a) the secondary linear monoamine in weight percent relative to the absorbent liquid.

According one or more embodiments of the present invention, in the absorbent liquid as described herein, a total concentration of the concentration of (a) the secondary linear monoamine and the concentration of (b1) the tertiary linear monoamine or (b2) the primary monoamine is 20 to 55% by weight or less.

According to one or more embodiments of the present invention, in the absorbent liquid as described herein, a total concentration of (a) the secondary linear monoamine, (b1) the tertiary linear monoamine or (b2) the primary monoamine, and (c) the secondary cyclic diamine is 70% by weight or less.

According to one or more embodiments of the present invention, in the absorbent liquid as described herein, the component (a) secondary linear monoamine is a compound represented by Formula (I) below:

[Chem. 1]

(I)

wherein, R1 is a hydrocarbon group having 1 to 4 carbon atoms, and R2 is a hydroxyalkyl group having 1 to 4 carbon atoms.

According to one or more embodiments of the present invention, in the absorbent liquid as described herein, (b1) the tertiary linear monoamine is a compound represented by Formula (II) below:

[Chem. 2]

(II)

wherein, R3 is a hydrocarbon group having 1 to 4 carbon atoms, and R4 and R5 are each a hydrocarbon group or a hydroxyalkyl group having 1 to 4 carbon atoms.

According to one or more embodiments of the present invention, in the absorbent liquid as described herein, (b2) the primary monoamine is a compound represented by Formula (III) below:

[Chem. 3]

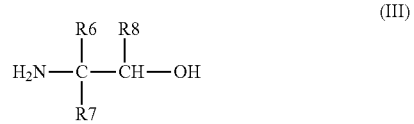

wherein, R6 to R8 are each a hydrocarbon group or a hydroxyalkyl group having 1 to 4 carbon atoms.

In addition, according to one or more embodiments of the present invention, in the absorbent liquid as described herein, (c) the secondary cyclic diamine is a piperazine derivative.

Moreover, according to one or more embodiments of the present invention, an apparatus for removing $CO_2$ and/or $H_2S$, includes: the absorbent liquid as described herein; an absorption tower which absorbs $CO_2$ and/or $H_2S$ from the gas; and a regeneration tower which regenerates the absorbent liquid containing the $CO_2$ and/or $H_2S$ absorbed therein by heat of a reboiler.

Furthermore, according to one or more embodiments of the present invention, a method for removing $CO_2$ and/or $H_2S$, includes: an absorption step of absorbing $CO_2$ and/or $H_2S$ by bringing the absorbent liquid as described herein into contact with the gas; and a regeneration step of regenerating the absorbent liquid containing the $CO_2$ and/or $H_2S$ absorbed therein by heat of a reboiler.

According to one or more embodiments of the present invention, by blending (a) a secondary linear monoamine, (b1) a tertiary linear monoamine or (b2) a sterically hindered primary monoamine, and (c) a secondary cyclic diamine at a predetermined ratio, it is possible to provide an absorbent liquid for $CO_2$ and/or $H_2S$, and an apparatus and a method using the same, which make it possible to reduce the amount of reboiler heat when regenerating the absorbent liquid.

DETAILED DESCRIPTION OF THE EMBODIMENTS

Figure 1:
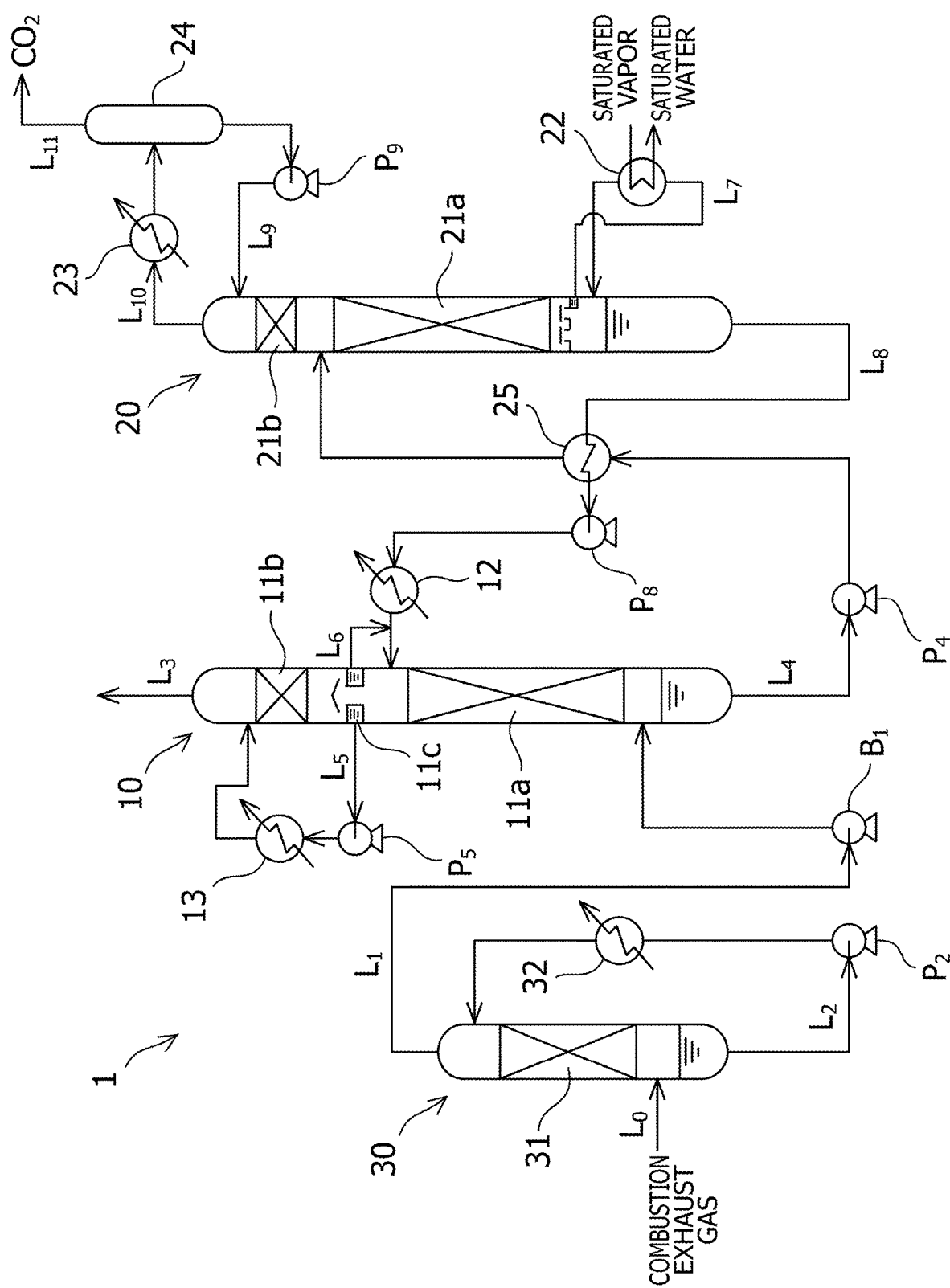
FIG. 1 is a schematic diagram illustrating an apparatus for removing $CO_2$ and/or $H_2S$ according to one or more embodiments of the present invention.

Hereinafter, a detailed description is provided for one or more embodiments of an absorbent liquid for $CO_2$ and/or $H_2S$, and an apparatus and a method using the same according to the present invention. The present invention is not limited to the embodiment described later.

A description is provided for the absorbent liquid according to one or more embodiments of the present invention. The absorbent liquid as described herein contains components of (a) a secondary linear monoamine, (b1) a tertiary linear monoamine, and (c) a secondary cyclic diamine Additionally, the concentration of each of the components of the secondary linear monoamine, the tertiary linear monoamine, and the secondary cyclic diamine is less than 30% by weight relative to the weight percent of the absorbent liquid. The total concentration of the secondary linear monoamine, the tertiary linear monoamine, and the secondary cyclic diamine is preferably 70% by weight or less and more preferably 10% by weight or more relative to the absorbent liquid. The absorbent liquid is formed by dissolving and mixing the above components in water, and the main constituent other than the above components is water.

The upper limit of the concentration of the secondary linear monoamine (a) is less than 30% by weight and is preferably 28% by weight or less. In addition, the lower limit of the concentration is more preferably 10% by weight or more and is further preferably 15% by weight or more. The upper limit of the concentration of the tertiary linear monoamine (b1) is less than 30% by weight, preferably 28% by weight or less, and further preferably 25% by weight or less. In addition, the lower limit of the concentration is preferably 10% by weight or more and more preferably 15% by weight or more. The upper limit of the concentration of the secondary cyclic diamine (c) is less than 30% by weight, preferably within a range of 15% by weight or less, and more preferably 10% by weight or less. In addition, the lower limit of the concentration is preferably 1% by weight or more and more preferably 5% by weight or more.

The total concentration of the secondary linear monoamine and the tertiary linear monoamine relative to the absorbent liquid is preferably 20 to 55% by weight and more preferably 25 to 50% by weight. In addition, the concentration of the tertiary linear monoamine is preferably the same as or less than the concentration of the secondary linear monoamine relative to the weight percent of the absorbent liquid. In particular, the concentration of the tertiary linear monoamine is more preferably 0.6 to 1 in a weight ratio relative to the concentration of a secondary linear amine. The concentration of the secondary cyclic diamine is preferably less than the concentrations of the secondary linear monoamine and the tertiary linear monoamine relative to the weight percent of the absorbent liquid.

As described above, if (a) the secondary linear monoamine, (b1) the tertiary linear monoamine, and (c) the secondary cyclic diamine are at the above concentrations, an excellent $CO_2$ absorbing property of (a) the secondary linear monoamine and (c) the secondary cyclic diamine maintains the $CO_2$ absorbability of the absorbent liquid, and an excellent $CO_2$ stripping property of (a) the secondary linear monoamine and (b1) the tertiary linear monoamine can improve the $CO_2$ stripping performance of the absorbent liquid. Thus, it is possible to reduce the reboiler heat duty when regenerating the absorbent liquid which has absorbed $CO_2$.

The secondary linear monoamine is a compound represented by Formula (I) below. In Formula (I), R1 represents a hydrocarbon group having 1 to 4 carbon atoms, and R2 represents a hydroxyalkyl group having 1 to 4 carbon atoms.

[Chem. 4]

(I)

In particular, the secondary linear monoamine is at least one selected from the group consisting of N-(methylamino) ethanol ($C_3H_9NO$), N-(ethylamino)ethanol ($C_4H_{11}NO$), N-(propylamino)ethanol ($C_5H_{13}NO$), and N-(butylamino) ethanol ($C_6H_{15}NO$).

The tertiary linear monoamine is a compound represented by Formula (II) below. In Formula (II), R3 represents a hydrocarbon group having 1 to 4 carbon atoms, R4 represents a hydrocarbon group or a hydroxyalkyl group having 1 to 4 carbon atoms, and R5 represents a hydrocarbon group or a hydroxyalkyl group having 1 to 4 carbon atoms.

[Chem. 5]

(II)

In particular, the tertiary linear monoamine is at least one selected from the group consisting of N-methyldiethanolamine ($C_5H_{13}NO_2$), N-ethyldiethanolamine ($C_6H_{15}NO_2$), N-butylethanolamine ($C_8H_{19}NO_2$), 4-dimethylamino-1-butanol ($C_6H_{15}NO$), 2-(dimethylamino)ethanol ($C_4H_{11}NO$), 2-(diethylamino)ethanol ($C_6H_{15}NO$), 2-di-n-butylaminoethanol ($C_{10}H_{23}NO$), N-ethyl-N-methylethanolamine ($C_5H_{13}NO$), 3-dimethylamino-1-propanol ($C_5H_{13}NO$), and 2-dimethylamino-2-methyl-1-propanol ($C_6H_{15}NO$).

In addition, the secondary cyclic diamine is a piperazine derivative. Examples of this piperazine derivative include compounds such as piperazine ($C_4H_{10}N_2$), 2-methylpiperazine ($C_5H_{12}N_2$), and 2,5-dimethylpiperazine ($C_6H_{14}N_2$), or a mixture thereof.

A description is provided for the absorbent liquid according to one or more embodiments of the present invention. The absorbent liquid as described herein is mainly different in that (b1) the tertiary linear monoamine described earlier as a component is replaced by (b2) a sterically hindered primary monoamine. Explanation of the same constituents as the aforementioned embodiments is omitted.

(b2) The sterically hindered primary monoamine is a compound represented by Formula (III) below. In Formula (III), R6 to R8 each represent a hydrogen group or a hydrocarbon group having 1 to 3 carbon atoms.

[Chem. 6]

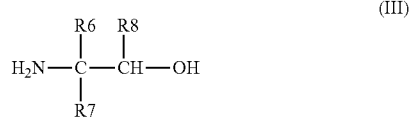

(III)

In particular, the primary monoamine is at least one selected from the group consisting of 2-amino-2-methyl-1-propanol ($C_4H_{11}NO$), 2-amino-1-propanol ($C_3H_9NO$), 2-amino-1-butanol ($C_4H_{11}NO$), 2-amino-3-methyl-1-butanol ($C_5H_{13}NO$), 1-amino-2-propanol ($C_3H_9NO$), and 1-amino-2-butanol ($C_4H_{11}NO$).

The concentration of each of the components of the secondary linear monoamine, the sterically hindered primary monoamine, and the secondary cyclic diamine is less than 30% by weight relative to the weight percent of the absorbent liquid. The total concentration of the secondary linear monoamine, the sterically hindered primary monoamine, and the secondary cyclic diamine is preferably 70% by weight or less and more preferably 10% by weight or more relative to the absorbent liquid. The upper limit of the concentration of the secondary linear monoamine (a) is less than 30% by weight and is preferably 28% by weight or less. In addition, the lower limit of the concentration is more preferably 10% by weight or more and is further preferably 15% by weight or more. The upper limit of the concentration of the sterically hindered primary monoamine (b2) is less than 30% by weight, preferably 28% by weight or less, and further preferably 25% by weight or less. In addition, the lower limit of the concentration is preferably 10% by weight or more and more preferably 15% by weight or more. The upper limit of the concentration of the secondary cyclic diamine (c) is less than 30% by weight, preferably within a range of 15% by weight or less, and more preferably 10% by weight or less. In addition, the lower limit of the concentration is preferably 1% by weight or more and more preferably 5% by weight or more.

The total concentration of the secondary linear monoamine and the sterically hindered primary monoamine relative to the absorbent liquid is 20 to 55% by weight and preferably 25 to 50% by weight. In addition, the concentration of the sterically hindered primary monoamine is preferably the same as or less than the concentration of the secondary linear monoamine relative to the weight percent of the absorbent liquid. In particular, the concentration of the sterically hindered primary monoamine is preferably 0.6 to 1 in a weight ratio relative to the concentration of the secondary linear monoamine. The concentration of the secondary cyclic diamine is preferably less than the concentrations of the secondary linear monoamine and the primary monoamine relative to the weight percent of the absorbent liquid.

As described above, if (a) the secondary linear monoamine, (b2) the sterically hindered primary monoamine, and (c) the secondary cyclic diamine are at the above concentrations, an excellent $CO_2$ absorbing property of (a) the secondary linear monoamine and (c) the secondary cyclic diamine maintains the $CO_2$ absorbability of the absorbent liquid, and an excellent $CO_2$ stripping property of (a) the secondary linear monoamine and (b2) the sterically hindered primary monoamine can improve the $CO_2$ stripping performance of the absorbent liquid. Thus, it is possible to reduce the amount of reboiler heat when regenerating the absorbent liquid which has absorbed $CO_2$.

[$CO_2$ Removing Apparatus]

A description is provided for an embodiment of a $CO_2$ removing apparatus employing the absorbent liquid having the above constitution with reference to FIG. 1. A $CO_2$ removing apparatus 1 illustrated in FIG. 1 at least includes an absorption tower 10 and a regeneration tower 20. The $CO_2$ removing apparatus in the figure is a diagram for its overall description, and its accompanying equipment is partially omitted.

The absorption tower 10 includes a lower packed section 11a, an upper packed section or a tray 11b, and a liquid collector 11c, contains an absorbent liquid inside which absorbs $CO_2$ and/or $H_2S$ in combustion exhaust gas, and includes coolers 12 and 13 outside. The regeneration tower 20 is provided downstream of the flow direction of the absorbent liquid which has absorbed $CO_2$ of the absorption tower 10, includes lower packed section 21a and an upper packed section or a tray 21b, and includes a reboiler 22, a cooler 23, and a gas-liquid separator 24 outside thereof. The regeneration tower 20 includes an absorbent liquid heat exchanger 25 between the absorption tower 10 and the regeneration tower 20. The regeneration tower 20 is configured to regenerate the absorbent liquid which has absorbed $CO_2$ and/or $H_2S$ by heat of the reboiler. In addition, the $CO_2$ removing apparatus 1 includes a cooling tower 30 upstream of the flow direction of combustion exhaust gas of the absorption tower 10. The cooling tower 30 at least includes a packed section 31 which causes cooling water and gas to come into contact with each other, and includes a cooler 32 outside thereof which cools the cooling water.

[$CO_2$ Removing Method]

A description is provided for a $CO_2$ removing method according to one or more embodiments of the present invention by explaining how the $CO_2$ removing apparatus having the above configuration operates. The $CO_2$ removing method according to the present embodiment includes a cooling step, an absorption step, and a regeneration step.

At the cooling step, the combustion exhaust gas is supplied via a line $L_0$ to the cooling tower 30 for cooling. In the cooling tower 30, the combustion exhaust gas is brought into contact with the cooling water from the cooler 32 in the packed section 31, cooled to a predetermined temperature, and introduced by a blower $B_1$ via a line $L_1$ to a lower portion of the absorption tower 10. The temperature of the combustion exhaust gas to be cooled can be 30 to 40° C. as an example from the viewpoint of absorption performance. On the other hand, the cooling water which has come into contact with the combustion exhaust gas is stored in the lower end portion of the cooling tower 30, and then is circulated for use by a pump $P_2$ via a line $L_2$ and the cooler 32 to the cooling tower 30. At this step, if the amount of water in the combustion exhaust gas is small, since the cooling water is gradually reduced by humidifying and cooling the combustion exhaust gas, cooling water is supplied via a not-illustrated water supply line provided in the line $L_2$. If the amount of water in the combustion exhaust gas is large, since the amount of cooling water increases due to condensation of water in the combustion exhaust gas by contact with the cooling water, the excess amount of water is discharged via a drain discharge line (not shown) provided in the line $L_2$.

Subsequently, at the absorption step, the combustion exhaust gas introduced to the absorption tower 10 is brought into concurrent contact, in the lower packed section 11a, with the absorbent liquid introduced via a line $L_8$ and having a predetermined concentration to be described later. Thereby, the absorbent liquid absorbs $CO_2$ from the combustion exhaust gas, removing $CO_2$ from the combustion exhaust gas. In particular, the lower packed section 11a removes $CO_2$ by bringing the regenerated absorbent liquid (lean absorbent liquid) introduced via the line $L_8$ into contact with the combustion exhaust gas. This makes it possible to remove 90% or more of the $CO_2$ in the combustion exhaust gas. The combustion exhaust gas from which $CO_2$ has been removed contains an amine absorbent and water vaporized under a high temperature due to exothermic reaction by $CO_2$ absorption. Thus, water and the amine absorbent are condensed from the combustion exhaust gas into a liquid in the cooler 13, and moreover brought into contact with a washing liquid of cooled condensation water in the upper packed section 11b. Water and the amine absorbent in the gas are condensed and recovered as a washing liquid. Thereby, water and the absorbent liquid are collected from the combustion exhaust gas. The combustion exhaust gas from which $CO_2$ has been removed is discharged from the tower top portion of the absorption tower 10 to the line $L_3$. In addition, at this step, the washing liquid containing water and the absorbent liquid recovered from the combustion exhaust gas are collected in the liquid collector 11c, the pump $P_5$ circulates part of the washing liquid for use by cooling it with the cooler 13 on the line $L_5$, and an excess amount of washing liquid is added to the lean absorbent liquid via the line $L_6$ in order to be recovered as the absorbent liquid. On the other hand, the absorbent liquid which has absorbed $CO_2$ (rich absorbent liquid) is collected in the lower end portion located below the lower packed section 11a. The rich absorbent liquid is sent by the pump P 4 via the line L 4 to the absorbent liquid heat exchanger 25, followed by temperature rise by exchanging heat with the lean absorbent liquid to be described later, and then is sent to the regeneration tower 20.

The subsequent regeneration step is a step of regenerating the absorbent liquid by allowing the reboiler 22 to heat the $CO_2$-contain absorbent liquid to release $CO_2$ therefrom. To be more specific, the rich absorbent liquid supplied to the inside of the regeneration tower 20 flows down the regeneration tower 20 and is stored in the lower portion liquid reservoir while emitting $CO_2$ due to endothermic reaction occurring in the lower packed section 21a, and the reboiler 22 raises the temperature of the absorbent liquid having passed via the line $L_7$ by heat exchange with high-temperature saturated vapor supplied from the outside. Thereby, the $CO_2$ in the absorbent liquid is released. The saturated steam introduced into the reboiler 22 condenses into saturated water by heat exchange with the absorbent liquid and is discharged from the reboiler 22. By stripping $CO_2$ from the absorbent liquid, the lean absorbent liquid is obtained. As described above, a large amount of thermal energy of steam is required in order to regenerate the absorbent liquid by stripping $CO_2$ in the regeneration tower 20, especially in the reboiler 22. In the reboiler 22, since the absorbent liquid according to one or more embodiments of the present invention has a high $CO_2$ stripping performance as described above, it is possible to reduce the amount of saturated steam to be introduced into the reboiler 22 and thus to reduce the amount of reboiler heat duty by efficiently stripping $CO_2$.

The lean absorbent liquid from which $CO_2$ is stripped by heat supplied to the reboiler 22 is introduced into the absorbent liquid heat exchanger 25 via the line $L_8$. In the absorbent liquid heat exchanger 25, the lean absorbent liquid is cooled by heat exchange with the rich absorbent liquid from the absorption tower 10 and is introduced into the absorption tower 10. The temperature of the lean absorbent liquid to be introduced into the absorption tower 10 can be adjusted with the absorbent liquid heat exchanger 25 or a cooler 12 provided on the line $L_8$ downstream thereof. On the other hand, $CO_2$ separated from the absorbent liquid is subjected to the removal of accompanying absorbent liquid in the upper packed section 21b located at the upper portion of the regeneration tower 20 by gas-liquid contact with reflux water supplied via the line $L_9$. Then, the $CO_2$ is discharged to the line $L_{10}$ from the upper portion of the regeneration tower 20. The cooler 23 cools the $CO_2$ gas including water vapor on the line $L_{10}$ to condense water vapor, followed by separation into $CO_2$ and reflux water in which water vapor is condensed in the gas-liquid separator 24. Then, the separated $CO_2$ with high purity is discharged to the recovery line $L_{11}$ for recovery, and the reflux water is refluxed by the pump $P_9$ to the regeneration tower 20 via the line $L_9$ for reuse.

The highly pure $CO_2$ recovered as described above can be injected in a depleted oil field for storage or can be preferably reused in order to enhance oil and natural gas recovery, for the purpose of synthesizing chemical products such as urea and methanol, and for general purposes such as dry ice.

EXAMPLES

Hereinafter, one or more embodiments of the present invention is described in detail using examples. The absorbent liquid for $CO_2$ and/or $H_2S$, and the apparatus and the method using the same are not limited by the present examples.

1.1 Preparation According to Test Examples

An absorbent liquid of Test Example 1-1 was prepared by dissolving and mixing N-(butylamino)ethanol as the secondary linear monoamine, 2-methylpiperazine as the secondary cyclic diamine, and N-methyldiethanolamine as the tertiary linear monoamine into water, each less than 30% by weight. In addition, in the absorbent liquid, the secondary linear monoamine and the tertiary linear monoamine were contained at substantially the same concentrations in weight percent, and the secondary cyclic diamine was smallest in amount at a concentration in weight percent. An absorbent liquid of Test Example 1-2 was prepared in the same way as Test Example 1-1 except that the secondary cyclic diamine was piperazine. An absorbent liquid of Test Example 1-3 was prepared in the same way as Test Example 1-1 except that the tertiary linear monoamine was N-butyldiethanolamine. An absorbent liquid of Test Example 1-4 was prepared in the same way as Test Example 1-1 except that the secondary linear monoamine was N-(ethylamino)ethanol, the secondary cyclic diamine was piperazine, and the tertiary linear monoamine was N-ethyldiethanolamine. Test Example 1-5 was prepared in the same way as Test Example 1-1 except that the secondary linear monoamine was N-(ethylamino)ethanol, the secondary cyclic diamine was piperazine, and the tertiary linear monoamine was 2-(diethylamino)ethanol. In addition, as a comparative example, an absorbent liquid of Comparative Example 1-6 was prepared by dissolving and mixing monoethanolamine (MEA) into water at 30% by weight. Table 1 shows the component compositions of the test examples and the comparative example.

TABLE 1

Table 1 Components of Absorbent Liquid

| | (a) Secondary Linear Monoamine | (b1) Tertiary Linear Monoamine | (c) Secondary Cyclic Diamine |
|---|---|---|---|
| Test Example 1-1 | N-(Butyl-amino)ethanol | N-Methyl-diethanolamine | 2-Methyl-piperazine |
| Test Example 1-2 | N-(Butyl-amino)ethanol | N-Methyl-diethanolamine | Piperazine |
| Test Example 1-3 | N-(Butyl-amino)ethanol | N-Butyl-diethanolamine | 2-Methyl-piperazine |
| Test Example 1-4 | N-(Ethyl-amino)ethanol | N-Ethyl-diethanolamine | Piperazine |
| Test Example 1-5 | N-(Ethyl-amino)ethanol | 2-(Diethylamino)ethanol | Piperazine |
| Primary Monoamine | | | |
| Comparative Example 1-6 | Monoethanolamine | | |

1.2 Evaluation of Reboiler Heat Duty Ratio

Figure 2:
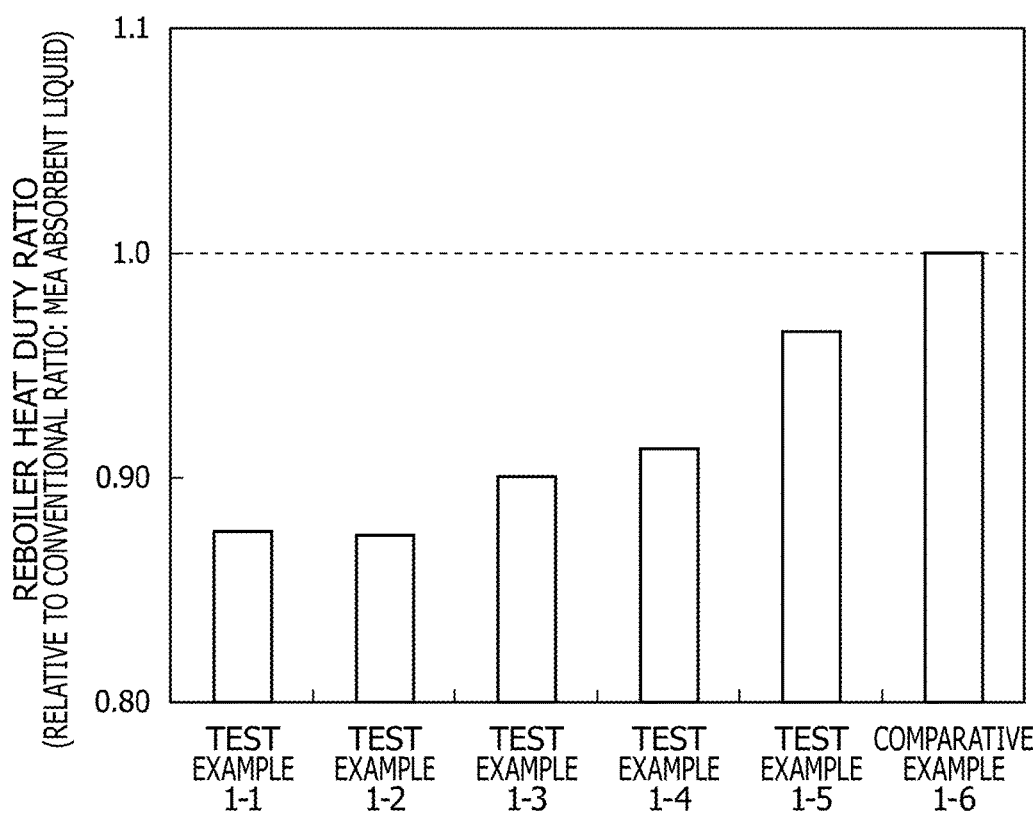
FIG. 2 is a graph illustrating reboiler heat duty ratios of examples and a comparative example of an absorbent liquid according to the present invention.

The reboiler heat duty was measured when the absorbent liquids of the test examples and the comparative example were used, and the reboiler heat duty for the test examples was evaluated as a heat duty ratio compared to the case of using the absorbent liquid of the comparative example. FIG. 2 illustrates the evaluation results.

As illustrated in FIG. 2, if the heat duty in the case of using the absorbent liquid of Comparative Example 1-6 is set to 1, the reboiler heat duty ratios in the case of using the absorbent liquids of Test Examples 1-1 and 1-2 were less than 0.90, the reboiler heat duty ratios in the case of using the absorbent liquids of Test Examples 1-3 and 1-4 were about 0.90, and the reboiler heat duty ratio in the case of using the absorbent liquid of Test Example 1-5 was about 0.96. The above results show that the absorbent liquids of Test Examples 1-1 to 1-5 employing the secondary linear monoamine, the secondary cyclic diamine, and the tertiary linear monoamine can reduce the reboiler heat duty by 10% or more compared to Comparative Example 1-6 employing monoethanolamine. In particular, the absorbent liquids of Test Examples 1-1 to 1-3 were shown to be able to reduce the reboiler heat duty by 10% or more.

Figure 3:
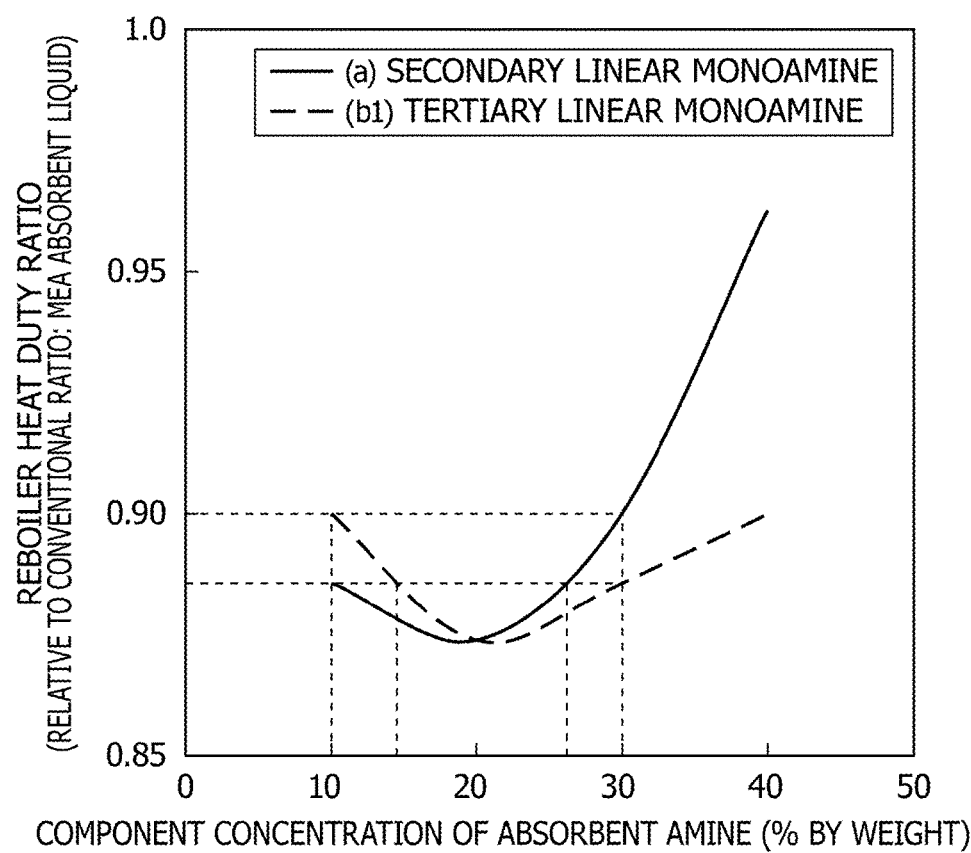
FIG. 3 is a graph illustrating a reboiler heat duty ratio with respect to an amine component concentration of the examples and the comparative example of the absorbent liquid according to the present invention.

1.3 Evaluation of Reboiler Heat Duty Ratio with Respect to Component Concentration Subsequently, an absorbent liquid was prepared by dissolving and mixing N-(butylamino)ethanol as the secondary linear monoamine and N-butyldiethanolamine as the tertiary linear monoamine into water with the total concentration of the two components at 40% by weight. Then, investigation was carried out for the reboiler heat duty ratio in the case of varying the concentrations of the components while keeping this total concentration constant at 40% by weight. The reboiler heat duty ratio was calculated such that the result of using the absorbent liquid of Test Example 1-6 is 1. FIG. 3 shows the evaluation results.

As illustrated in FIG. 3, if the component concentration of the secondary linear monoamine was 10% by weight, the reboiler heat duty ratio was about 0.88, and the reboiler heat duty ratio decreased while the component concentration increased toward about 20% by weight. The reboiler heat duty ratio in the case of the component concentration of about 20% by weight was about 0.87, the reboiler heat duty ratio in the case of about 25% by weight was about 0.88, and the reboiler heat amount ratio increased toward about 0.90 while the component concentration increased toward 30% by weight. In addition, if the component concentration of the tertiary linear monoamine was 10% by weight, the reboiler heat duty ratio was about 0.90, the reboiler heat duty ratio in the case of about 15% by weight was about 0.88, and the reboiler heat duty ratio decreased while the component concentration increased toward 20% by weight. The reboiler heat duty ratio in the case of the component concentration of about 20% by weight was about 0.87, and the reboiler heat duty ratio increased toward about 0.88 while the component concentration increased toward 30% by weight.

2.1 Preparation of Test Examples

An absorbent liquid of Test Example 2-1 was prepared by dissolving and mixing N-(butylamino)ethanol as the secondary linear monoamine, 2-methylpiperazine as the secondary cyclic diamine, and 2-amino-2-methyl-1-propanol as the sterically hindered primary monoamine into water, each less than 30% by weight. In addition, in the absorbent liquid, the secondary linear monoamine and the primary monoamine were contained at substantially the same concentrations in weight percent, and the secondary cyclic diamine was smallest in amount at a concentration in weight percent, as in the case of the test examples described earlier. An absorbent liquid of Test Example 2-2 was prepared in the same way as Test Example 2-1 except that the secondary cyclic diamine was piperazine. An absorbent liquid of Test Example 2-3 was prepared in the same way as Test Example 2-1 except that the secondary linear monoamine was N-(ethylamino)ethanol. An absorbent liquid of Test Example 2-4 was prepared in the same way as Test Example 2-1 except that the secondary cyclic diamine was piperazine and the secondary linear monoamine was N-(ethylamino)ethanol. In addition, as a comparative example, an absorbent liquid of Comparative Example 2-5 was prepared by dissolving and mixing monoethanolamine (MEA) into water at 30% by weight. Table 2 shows the component compositions of the test examples and the comparative example.

TABLE 2

Table 2 Components of Absorbent Liquid

| | (a) Secondary Linear Monoamine | (b2) Primary Monoamine | (c) Secondary Cyclic Diamine |
|---|---|---|---|
| Test Example 2-1 | N-(Butyl-amino)ethanol | 2-Amino-2-methyl-1-propanol | 2-Methyl-piperazine |
| Test Example 2-2 | N-(Butyl-amino)ethanol | 2-Amino-2-methyl-1-propanol | Piperazine |
| Test Example 2-3 | N-(Ethyl-amino)ethanol | 2-Amino-2-methyl-1-propanol | 2-Methyl-piperazine |
| Test Example 2-4 | N-(Ethyl-amino)ethanol | 2-Amino-2-methyl-1-propanol | Piperazine |
| | primary monoamine | | |
| Comparative Example 2-5 | monoethanolamine | | |

2.2 Evaluation of Reboiler Heat Duty Ratio

Figure 4:
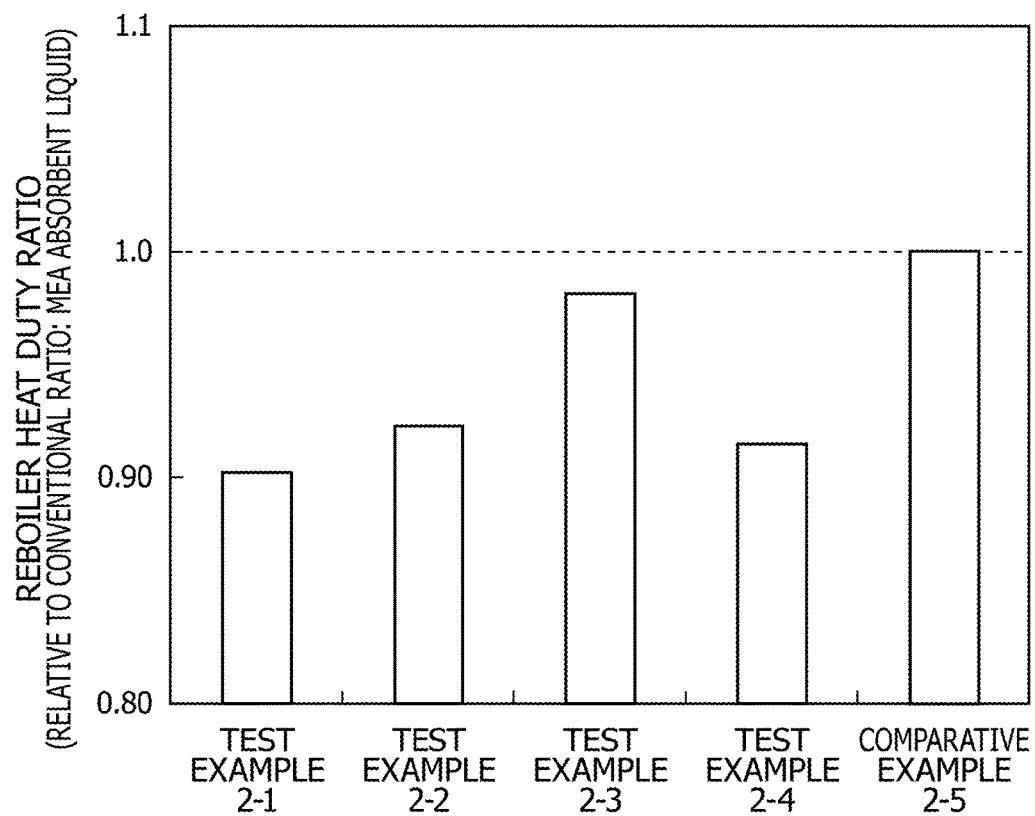
FIG. 4 is a graph illustrating reboiler heat duty ratios of examples and a comparative example of the absorbent liquid according to the present invention.

The reboiler heat duty was measured when the absorbent liquids of Test Examples 2-1 to 2-4 and Comparative Example 2-5 were used, and the reboiler heat duty for the test examples was evaluated as a heat duty ratio compared to the case of using the absorbent liquid of the comparative example in the same way as the evaluation of heat duty ratio described earlier. FIG. 4 illustrates the evaluation results.

As illustrated in FIG. 4, in comparison with the absorbent liquid of Comparative Example 2-5, the reboiler heat duty ratio in the case of using the absorbent liquid of Test Example 2-1 was about 0.90, the reboiler heat duty ratios in the case of using the absorbent liquids of Test Examples 2-2 and 2-4 were less than 0.93, and the reboiler heat duty ratio in the case of using the absorbent liquid of Test Example 2-3 was about 0.98.

The above results show that the absorbent liquids of Test Examples 2-1 to 2-4 employing the secondary linear monoamine, the secondary cyclic diamine, and the sterically hindered primary monoamine can reduce the amount of reboiler heat by about 10% compared to the absorbent liquid of Comparative Example 2-5 employing monoethanolamine. In particular, the absorbent liquid of Test Example 2-1, 2-2, or 2-4 was shown to be able to reduce the amount of reboiler heat by 7 to 10%.

Figure 5:
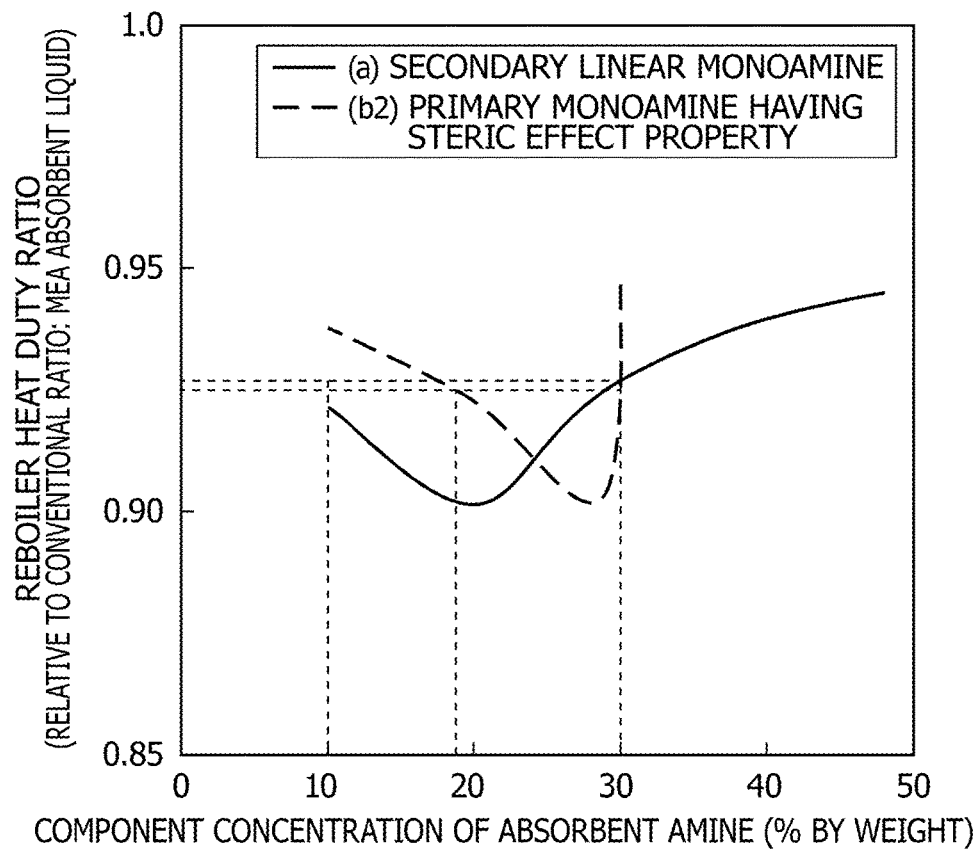
FIG. 5 is a graph illustrating a reboiler heat duty ratio with respect to an amine component concentration of the examples and the comparative example of the absorbent liquid according to the present invention.

2.3 Evaluation of Reboiler Heat Duty Ratio with Respect to Component Concentration Subsequently, an absorbent liquid was prepared by mixing N-(butylamino)ethanol as the secondary linear monoamine and 2-amino-2-methyl-1-propanol as the sterically hindered primary monoamine into water with the total concentration of the two components at 48% by weight. Then, investigation was carried out for the reboiler heat amount ratio in the case of varying the concentrations of the components while keeping this total concentration constant at 48% by weight in a range of 2-amino-2-methyl-1-propanol 30% by weight or less. The reboiler heat amount ratio was calculated such that the result of using the absorbent liquid of Test Example 2-5 is 1. FIG. 5 shows the evaluation results.

As illustrated in FIG. 5, if the component concentration of the secondary linear monoamine was about 10% by weight, the reboiler heat duty ratio was about 0.92, the reboiler heat duty ratio decreased to about 0.90 while the component concentration increased toward about 20% by weight, and the reboiler heat duty ratio increased to about 0.93 while the component concentration increased toward 30% by weight. In addition, if the component concentration of the primary monoamine was 10% by weight, the reboiler heat amount ratio was about 0.94, the reboiler heat amount ratio decreased to about 0.92 while the component concentration increased toward about 20% by weight, the reboiler heat duty ratio decreased to about 0.90 while the component concentration increased toward about 28% by weight, and the reboiler heat duty ratio rapidly increased to about 0.92 while the component concentration increased toward 30% by weight.

REFERENCE SYMBOL LIST

1 $CO_2$ removing apparatus
10 collection tower
11a lower packed section
11b upper packed section
11c liquid collector
12, 13, 23, 32 cooler
20 regeneration tower
22 reboiler
24 gas-liquid separator 25 absorbent liquid heat exchanger
30 cooling tower
31 packed section Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. An absorbent liquid which absorbs at least one of $CO_2$ and $H_2S$ from a gas, consisting of:
    water;
    a secondary linear monoamine;
    a sterically hindered primary monoamine; and
    a secondary cyclic diamine, wherein
    a concentration of each of the secondary linear monoamine, the tertiary linear monoamine or the sterically hindered primary monoamine and the secondary cyclic diamine is less than 30% by weight, and
    wherein the secondary linear monoamine is at least one selected from the group consisting of: N-(methylamino)ethanol, N-(ethylamino)ethanol, N-(propylamino)ethanol, and N-(butylamino)ethanol, and
    wherein the sterically hindered primary monoamine is at least one selected from the group consisting of: 2-amino-1-propanol, 2-amino-1-butanol, 2-amino-3-methyl-1-butanol, 1-amino-2-propanol, and 1-amino-2-butanol.

2. The absorbent liquid according to claim 1, wherein the concentration of the secondary cyclic diamine is less than the concentration of the secondary linear monoamine and is less than the concentration of the sterically hindered primary monoamine in weight percent relative to the absorbent liquid.

3. The absorbent liquid according to claim 2, wherein concentration of the secondary linear monoamine is from 10% by weight to 28% by weight.

4. The absorbent liquid according to claim 3, wherein the absorbent liquid consists of:
    the water;
    the secondary linear monoamine;
    the steric ally hindered primary monoamine; and
    the secondary cyclic diamine, and
    wherein the concentration of the sterically hindered primary monoamine is 20% by weight or more.

5. The absorbent liquid according to claim 1, wherein the secondary cyclic diamine is a piperazine derivative.

6. The absorbent liquid according to claim 5, wherein the secondary cyclic diamine is piperazine, 2-methylpiperazine, 2,5-dimethylpiperazine, or a mixture thereof.

7. The absorbent liquid according to claim 1, wherein the concentration of the sterically hindered primary monoamine is the same as or less than the concentration of the secondary linear monoamine in weight percent relative to the absorbent liquid.

8. The absorbent liquid according to claim 1, wherein a total concentration of the secondary linear monoamine and sterically hindered primary monoamine is 20 to 55% by weight.

9. The absorbent liquid according to claim 1, wherein a total concentration of the secondary linear monoamine, the sterically hindered primary monoamine, and the secondary cyclic diamine is 70% by weight or less.

10. The absorbent liquid according to claim 1, wherein the concentration of each of the secondary linear monoamine, and the sterically hindered primary monoamine, is 10% by weight or more.

11. An apparatus for removing at least one of $CO_2$ and $H_2S$ from a gas, comprising:
    an absorption tower which includes the absorbent liquid according to claim 1; and
    a regeneration tower which regenerates the absorbent liquid containing the at least one $CO_2$ and $H_2S$ absorbed therein by heat of a reboiler.

12. A method for removing at least one of $CO_2$ and $H_2S$ from a gas, the method comprising:
    absorbing at least one of $CO_2$ and $H_2S$ by bringing the absorbent liquid according to claim 1 into contact with the gas; and
    regenerating the absorbent liquid containing the at least one of $CO_2$ and $H_2S$ absorbed therein by heat of a reboiler.

* * * * *